United States Patent
Kojima et al.

(10) Patent No.: US 9,125,265 B2
(45) Date of Patent: Sep. 1, 2015

(54) LIGHT-EMITTING DEVICE CONTROL CIRCUIT

(75) Inventors: Hiroyuki Kojima, Gunma (JP); Noriaki Okada, Ota (JP); Kazuhiko Saito, Ota (JP); Shuhei Kawai, Ota (JP); Feng Xu, Kiryu (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 325 days.

(21) Appl. No.: 13/569,945

(22) Filed: Aug. 8, 2012

(65) Prior Publication Data

US 2013/0038229 A1    Feb. 14, 2013

(30) Foreign Application Priority Data

Aug. 11, 2011    (JP) .................................. 2011-175882
Jun. 15, 2012    (JP) .................................. 2012-135578

(51) Int. Cl.
H05B 33/08    (2006.01)
H05B 37/02    (2006.01)

(52) U.S. Cl.
CPC ........ *H05B 33/0818* (2013.01); *H05B 33/0851* (2013.01)

(58) Field of Classification Search
None
See application file for complete search history.

(56) References Cited

U.S. PATENT DOCUMENTS

2013/0002161 A1* 1/2013 Xu et al. .................... 315/200 R

FOREIGN PATENT DOCUMENTS

JP    2010-245421    10/2010

* cited by examiner

*Primary Examiner* — Jany Richardson
(74) *Attorney, Agent, or Firm* — Rennie William Dover (57) ABSTRACT

In a control circuit for a light-emitting device, a reference voltage generation circuit detects a full-wave rectified voltage and generates a first voltage as well as generating a second voltage by converting the rectified voltage into a DC voltage. A voltage corresponding to a difference between the first voltage and the second voltage or a voltage corresponding to a ratio of the first voltage to the second voltage is generated as a reference voltage by a subtraction circuit or by a division circuit, respectively. As a result, a change in amplitude of the reference voltage can be suppressed when amplitude of the rectified voltage is varied due to a variation in an AC input voltage supplied from an AC power supply.

20 Claims, 10 Drawing Sheets

Vin

Vrc

Vref

LIGHT-EMITTING DEVICE CONTROL CIRCUIT

CROSS-REFERENCE OF THE INVENTION

This application claims priority from Japanese Patent Application Nos. 2011-175882 and 2012-135578, the contents of which are incorporated herein by reference in their entireties.

BACKGROUND OF THE INVENTION

1. Field of the Invention

This invention relates to a control circuit for a light-emitting device.

2. Description of the Related Art

In recent years, a light-emitting diode (LED) has come into widespread use as a light-emitting device for lighting to replace an incandescent electric lamp from a standpoint of energy saving and the like.

Figure 7:
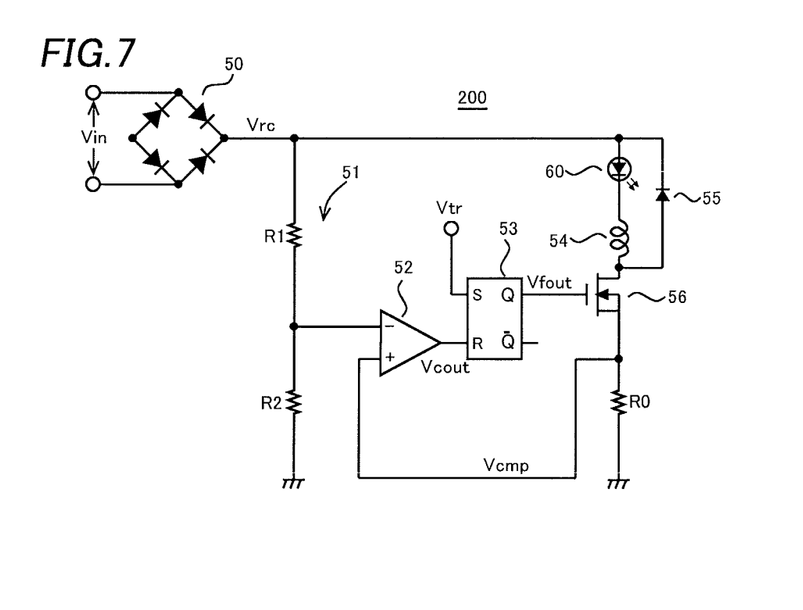
FIG. 7 is a circuit diagram of a conventional light-emitting device control circuit.

FIG. 7 is a circuit diagram of a conventional control circuit 200 for a light emitting device directed toward improving a power factor. The control circuit 200 includes a rectification circuit 50, a reference voltage generation circuit 51, a comparator 52, an RS flip-flop 53, a choke coil 54, a regeneration diode 55, a switching device 56 and a resistor R0 for current detection.

When an alternating current (AC) input voltage Vin is applied to input terminals of the rectification circuit 50, the input voltage Vin is full-wave rectified by the rectification circuit 50. A full-wave rectified voltage Vrc is supplied to an anode of an LED 60 as a drive voltage. A cathode of the LED 60 is connected to a ground through the choke coil 54, the switching device 56 and the resistor R0. A terminal voltage of the resistor R0 is applied to a non-inverting input terminal (+) of the comparator 52 as a comparison voltage Vcmp.

Figure 8:
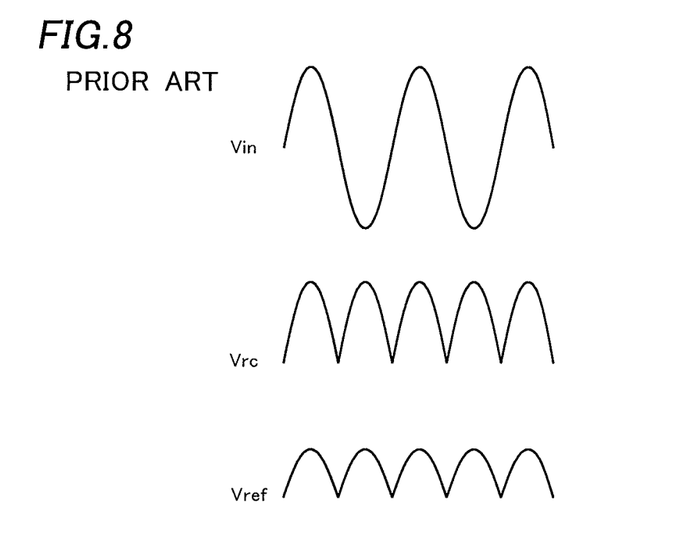
FIG. 8 is a waveform diagram showing a reference voltage and the like in the conventional light-emitting device control circuit.

The reference voltage generation circuit 51 is composed of resistors R1 and R2 connected in series between an output terminal of the rectification circuit 50 and the ground, and generates a reference voltage Vref by dividing the full-wave rectified voltage Vrc. The reference voltage Vref is applied to an inverting input terminal (−) of the comparator 52. Waveforms of the AC input voltage Vin, the rectified voltage Vrc and the reference voltage Vref are shown in FIG. 8.

The comparator 52 compares the comparison voltage Vcmp with the reference voltage Vref. A comparison output voltage Vcout from the comparator 52 is at an H level when the comparison voltage Vcmp is larger than the reference voltage Vref, and at an L level when the comparison voltage Vcmp is smaller than the reference voltage Vref. The comparison output voltage Vcout is applied to a reset terminal R of the RS flip-flop 53.

A trigger pulse Vtr is periodically inputted to a set terminal S of the RS flip-flop 53. The RS flip-flop 53 outputs a flip-flop output voltage Vfout from its output terminal Q. The flip-flop output voltage Vfout is applied to a gate of an N-channel type MOS transistor that makes the switching device 56.

Figure 9:
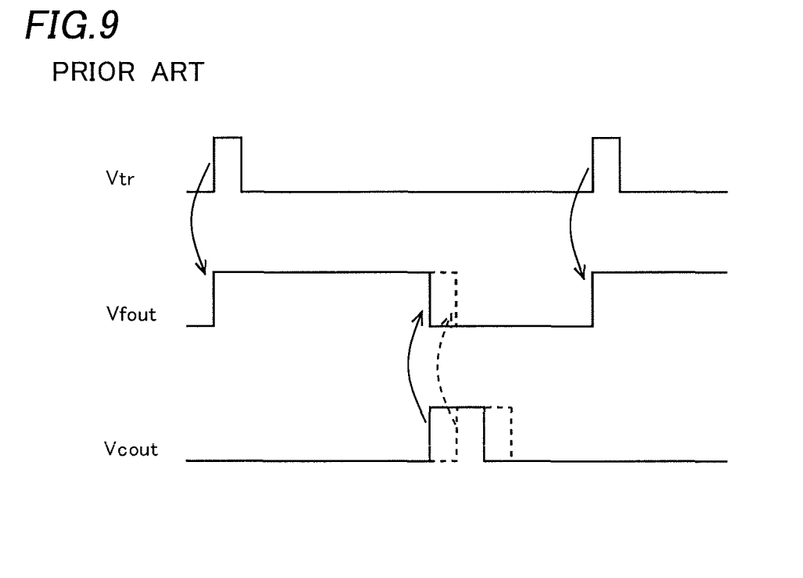
FIG. 9 is a timing chart showing operation of the conventional light-emitting device control circuit.

The RS flip-flop 53 is set in response to the trigger pulse Vtr, and is reset in response to the comparison output voltage Vcout from the comparator 52, as shown in FIG. 9.

When the RS flip-flop 53 is set in response to the trigger pulse Vtr, the flip-flop output voltage Vfout is turned to the H level and the switching device 56 is turned on. As a result, the LED 60 is provided with a current flowing through the choke coil 53, the switching device 56 and the resistor R0, and the LED 60 is turned on. The current flows through the resistor R0 at that time, and the comparison voltage Vcmp that is the terminal voltage of the resistor R0 is raised as a result. When the comparison voltage Vcmp becomes larger than the reference voltage Vref, the comparison output voltage Vcout is turned to the H level to reset the RS flip-flop 53. At that time, since a change in the current flowing through the choke coil 54 is proportional to an electric potential difference between both ends of the choke coil 54, there is required a certain period of time after the switching device 56 is turned on and before the comparison voltage Vcmp becomes larger than the reference voltage Vref.

When the RS flip-flop 53 is reset, the flip-flop output voltage Vfout is turned to the L level and the switching device 56 is turned off. As a result, the current provided to the LED 60 through the switching device 56 is cutoff. When the switching device 56 is turned off, the comparison voltage Vcmp is lowered because no current flows through the resistor R0. Then, the comparison output voltage Vcout from the comparator 52 returns to the L level when the comparison voltage Vcmp becomes smaller than the reference voltage Vref.

The control circuit 200 can control average intensity of light emission of the LED 60 by controlling the current flowing through the LED 60 as described above. A regeneration diode 55 is connected in parallel with the LED 60 and the choke coil 54 so that energy stored in the choke coil 54 is returned to the LED 60 when the switching device 56 is turned off.

This kind of control circuit for the light-emitting device is disclosed in Japanese Patent Application Publication No. 2010-245421.

Figure 10:
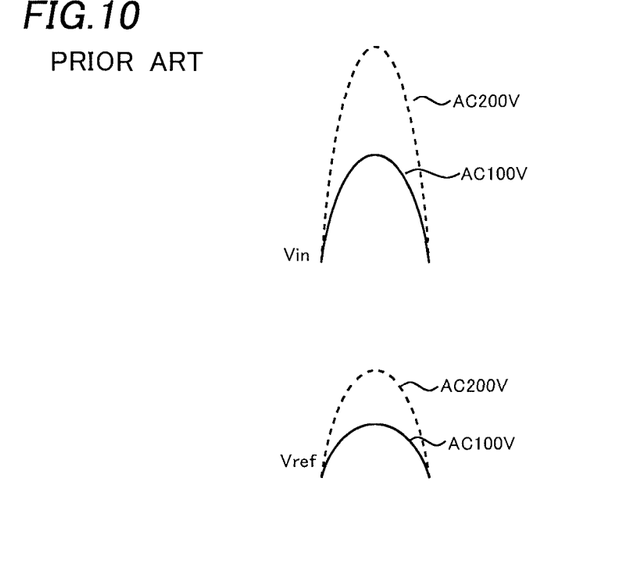
FIG. 10 is a waveform diagram showing a reference voltage and the like in the conventional light-emitting device control circuit.

A voltage of AC power supply for households differs from area to area or country to country, and varies in a range between 100V and 200V, for example. As a result, there is a problem with the conventional control circuit 200 that when amplitude of the AC input voltage Vin increases from 100V to 200V, for example, amplitude of the reference voltage Vref increases accordingly to increase the current provided to the LED 60, as shown in FIG. 10.

That is, when the amplitude of the AC input voltage Vin is increased, the amplitude (peak voltage) of the reference voltage Vref is also increased accordingly, since the reference voltage Vref is a divided voltage of the rectified voltage Vrc that is generated by full-wave rectifying the AC input voltage Vin.

As a result, the period of time after the switching device 56 is turned on and before the comparison voltage Vcmp becomes larger than the reference voltage Vref is increased. Therefore, a period of time after the RS flip-flop 53 is set by the trigger pulse Vtr and before the RS flip-flop 53 is reset by the comparison output voltage Vcout from the comparator 52 is also increased and a period of time during which the LED 60 is provided with the current flowing through the switching device 56 is increased accordingly. (Refer to the flip-flop output voltage Vfout and the comparison output voltage Vcout indicated by dashed lines in FIG. 9.)

SUMMARY OF THE INVENTION

The invention is directed to a control circuit for a light-emitting device. The control circuit includes a rectification circuit rectifying an AC voltage to generate a rectified voltage, a switching device configured to turn on and off the light emitting device, a reference voltage generation circuit generating a reference voltage, and a first comparator comparing a comparison voltage with the reference voltage. The comparison voltage corresponds to a current flowing through the light-emitting device in response to the rectified voltage. The control circuit also includes a flip-flop configured to be set in response to a trigger pulse and reset in response to a result of comparison by the first comparator. The flip-flop outputs an output voltage and controlling the switching device in accordance with the output voltage. The reference voltage generation circuit is configured so that a change in amplitude of the reference voltage is suppressed when amplitude of the AC voltage varies.

DETAILED DESCRIPTION OF THE INVENTION

Figure 1:
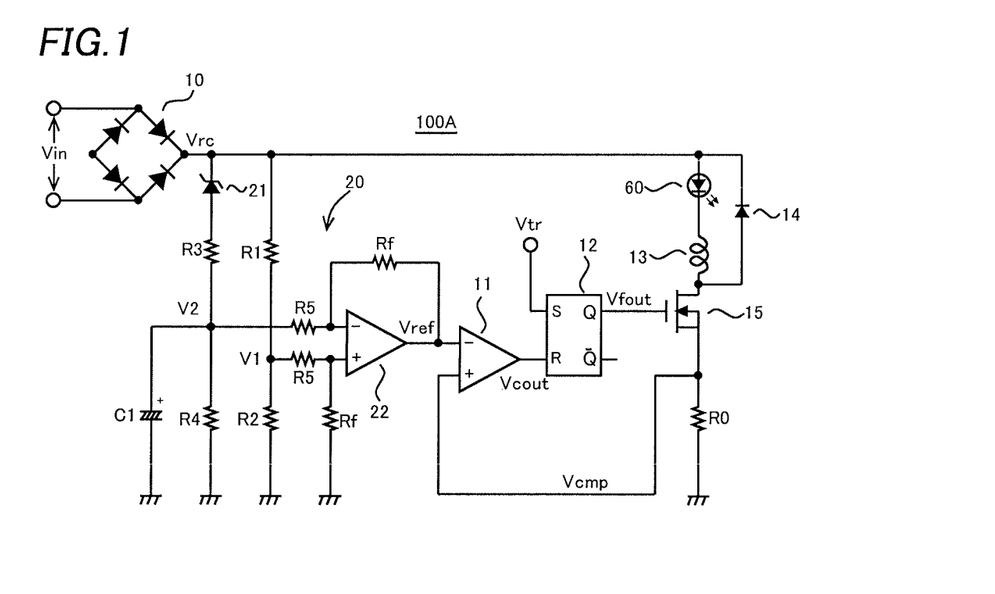
FIG. 1 is a circuit diagram of a light-emitting device control circuit according to a first embodiment of this invention.

FIG. 1 is a circuit diagram of a control circuit 100A for a light-emitting device according to a first embodiment of this invention. The control circuit 100A includes a rectification circuit 10, a reference voltage generation circuit 20, a comparator 11, an RS flip-flop 12, a choke coil 13, a regeneration diode 14, a switching device 15 and a resistor R0 for current detection.

When an alternating current (AC) input voltage Vin is applied to input terminals of the rectification circuit 10, the input voltage Vin is full-wave rectified by the rectification circuit 10. A full-wave rectified voltage Vrc is supplied to an anode of an LED 60 as a drive voltage. A cathode of the LED 60 is connected to a ground through the choke coil 13, the switching device 15 and the resistor R0 that are connected in series. A current from the LED 60 flows through the switching device 15 and the resistor R0, and is detected as a terminal voltage of the resistor R0. The terminal voltage of the resistor R0 is applied to a non-inverting input terminal (+) of the comparator 11 as a comparison voltage Vcmp.

The control circuit 100A differs from the conventional control circuit 200 shown in FIG. 7 in a structure of the reference voltage generation circuit 20 that generates a reference voltage Vref. The reference voltage generation circuit 20 generates a first voltage V1 by dividing the full-wave rectified voltage Vrc, and also generates a second voltage V2 by dividing the rectified voltage Vrc and smoothing (integrating) the divided voltage. Then, a subtraction circuit generates the reference voltage Vref that corresponds to a difference between the first voltage V1 and the second voltage V2. As a result, a change in amplitude of the reference voltage Vref can be suppressed when amplitude of the rectified voltage Vrc is varied due to a variation in the AC input voltage Vin supplied from an AC power supply.

A concrete structure of the reference voltage generation circuit 20 is described below. A first voltage dividing circuit is composed of a first resistor R1 and a second resistor R2 that are connected in series between an output terminal of the rectification circuit 10 to which the rectified voltage Vrc is outputted and the ground. The first voltage V1 is obtained from a connecting node between the first resistor R1 and the second resistor R2. The first voltage V1 is generated by dividing the rectified voltage Vrc, and is represented by Equation 1:

$$V1 = Vm \cdot |\sin \omega t| \cdot \frac{R2}{R1 + R2} \quad \text{[Equation 1]}$$

where each of R1 and R2 denotes a resistance of corresponding each of the first and second resistors R1 and R2. Vm denotes amplitude of the rectified voltage Vrc, ω denotes angular frequency of the AC input voltage Vin, and t denotes time. The first voltage V1 reaches its peak voltage Vp when sin ωt=1. The peak voltage Vp is represented by Equation 2:

$$Vp = Vm \cdot \frac{R2}{R1 + R2} \quad \text{[Equation 2]}$$

On the other hand, a second voltage dividing circuit is composed of a zener diode 21, a third resistor R3 and a fourth resistor R4, that are connected in series in the order as described above between the output terminal of the rectification circuit 10 to which the rectified voltage Vrc is outputted and the ground, and a smoothing capacitor C1 connected between a connecting node between the third resistor R3 and the fourth resistor R4 and the ground. A cathode of the zener diode 21 is connected to the output terminal of the rectification circuit 10. The second voltage V2 is obtained from the connecting node between the third resistor R3 and the fourth resistor R4. The third resistor R3 and the smoothing capacitor C1 make an integrator. The second voltage V2 is represented by Equation 3:

$$V2 = \left(\frac{2Vm}{\pi} - Vf\right) \cdot \frac{R2}{R1 + R2} \quad \text{[Equation 3]}$$

where each of R3 and R4 denotes a resistance of corresponding each of the third and fourth resistors R3 and R4. 2 Vm/π represents an average DC value of the rectified voltage Vrc, and Vf denotes a zener voltage of the zener diode 21. That is, the second voltage V2 is obtained by dividing an anode voltage (2 Vm/π-Vf) of the zener diode 21.

The subtraction circuit generating the reference voltage Vref that corresponds to the difference between the first voltage V1 and the second voltage V2 can be formed using a differential amplifier circuit. The first voltage V1 is inputted to a non-inverting input terminal (+) of an operational amplifier 22 through a resistor R5. The second voltage V2 is inputted to an inverting input terminal (−) of the operational amplifier 22 through another resistor R5. A resistor Rf is connected between an output terminal of the operational amplifier 22 and the inverting input terminal (−) as a negative feedback resistor. Another resistor Rf is connected between the non-inverting input terminal (+) of the operational amplifier 22 and the ground.

Then, the reference voltage Vref obtained from the output terminal of the operational amplifier 22 is represented by Equation 4:

$$Vref = (V1 - V2) \cdot \frac{Rf}{R5} \quad \text{[Equation 4]}$$

Equation 5 is obtained by substituting Equation 1 and Equation 3 into Equation 4:

$$Vref = \left\{ Vm \cdot \left( |\sin \omega t| \cdot \frac{R2}{R1+R2} - \frac{2}{\pi} \cdot \frac{R4}{R3+R4} \right) + Vf \cdot \frac{R4}{R3+R4} \right\} \cdot \frac{Rf}{R5} \quad \text{[Equation 5]}$$

A peak voltage Vref(p) of the reference voltage Vref is represented by Equation 6:

$$Vref(p) = \left\{ Vm \cdot \left( \frac{R2}{R1+R2} - \frac{2}{\pi} \cdot \frac{R4}{R3+R4} \right) + Vf \cdot \frac{R4}{R3+R4} \right\} \cdot \frac{Rf}{R5} \quad \text{[Equation 6]}$$

When resistance ratios are set so that a coefficient of Vm is equal to zero (that is, R2/(R1+R2)−2/π×R4/(R3+R4)=0), the peak voltage Vref(p) is represented by Equation 7:

$$Vref(p) = Vf \cdot \frac{R4}{R3+R4} \cdot \frac{Rf}{R5} \quad \text{[Equation 7]}$$

Figure 2:
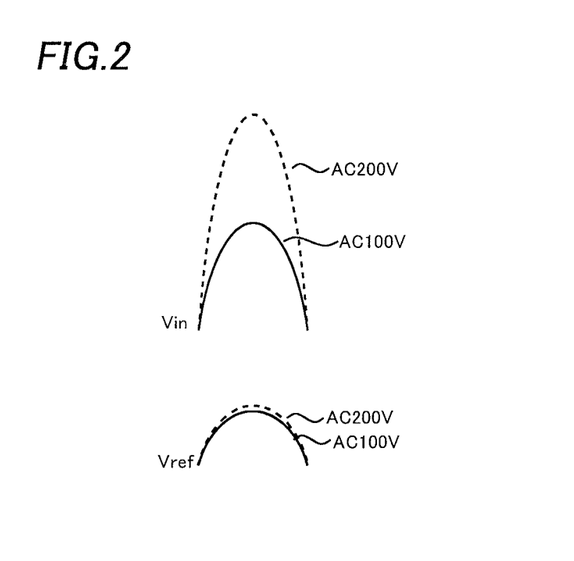
FIG. 2 is a waveform diagram showing a reference voltage and the like in the light-emitting device control circuit according to the first embodiment of this invention.

That is, Vref(p) does not depend on the amplitude Vm of the AC input voltage Vin, and stays unchanged when the amplitude Vm varies. For example, when the amplitude of the AC input voltage Vin is increased from 100V to 200V as shown in FIG. 2, the amplitude of the reference voltage Vref in the conventional control circuit 200 is also increased accordingly. With the control circuit 100A according to the first embodiment of this invention, on the other hand, the increase in the reference voltage Vref can be suppressed compared with the conventional control circuit 200 in which the reference voltage Vref is generated by simply dividing the rectified voltage Vrc, and the peak voltage Vref(p) of the reference voltage Vref can be made constant by setting the resistance ratios as described above.

Other structures are the same as those in the conventional control circuit 200. The comparator 11 compares the comparison voltage Vcmp that is the terminal voltage of the resistor R0 with the reference voltage Vref generated by the reference voltage generation circuit 20. A comparison output voltage Vcout from the comparator 11 is at an H level when the comparison voltage Vcmp is larger than the reference voltage Vref, and at an L level when the comparison voltage Vcmp is smaller than the reference voltage Vref. The comparison output voltage Vcout from the comparator 11 is applied to a reset terminal R of the RS flip-flop 12.

A trigger pulse Vtr is periodically inputted to a set terminal S of the RS flip-flop 12. When a frequency of the rectified voltage Vrc is between 100 Hz and 120 Hz, it is appropriate that a frequency of the trigger pulse Vtr is between 50 KHz and 100 KHz, which is sufficiently higher than the frequency of Vrc.

The RS flip-flop 12 outputs a flip-flop output voltage Vfout from its output terminal Q. The flip-flop output voltage Vfout is applied to a gate of an N-channel type MOS transistor that makes the switching device 15.

The RS flip-flop 12 is set in response to the trigger pulse Vtr, and is reset in response to the comparison output voltage Vcout from the comparator 11, as shown in FIG. 9. When the RS flip-flop 12 is set in response to the trigger pulse Vtr, the flip-flop output voltage Vfout is turned to the H level and the switching device 15 is turned on. Then, the LED 60 is provided with a current that flows through the choke coil 13, the switching device 15 and the resistor R0, and the LED 60 is turned on. Since the current flows through the resistor R0, the comparison voltage Vcmp that is the terminal voltage of the resistor R0 rises at that time. When the comparison voltage Vcmp becomes larger than the reference voltage Vref, the comparison output voltage Vcout is turned to the H level to reset the RS flip-flop 12.

When the RS flip-flop 12 is reset, the flip-flop output voltage Vfout is turned to the L level and the switching device 15 is turned off. As a result, the current provided to the LED 60 through the switching device 15 is cutoff. The control circuit 100A can control average intensity of light emission of the LED 60 by controlling the current flowing through the LED 60, as described above.

With the control circuit 100A, the change in the period of time after the switching device 15 is turned on and before the comparison voltage Vcmp becomes larger than the reference voltage Vref is reduced since the change in the amplitude of the reference voltage Vref is suppressed when the amplitude Vm of the rectified voltage Vrc is varied due to the variation in the AC input voltage Vin supplied from the AC power supply. As a result, the change in the intensity of the light emission of the LED 60 is reduced by reducing an amount of the change in the current flowing through the LED 60 due to the change in the amplitude of the rectified voltage Vrc, while the power factor is improved.

Figure 3:
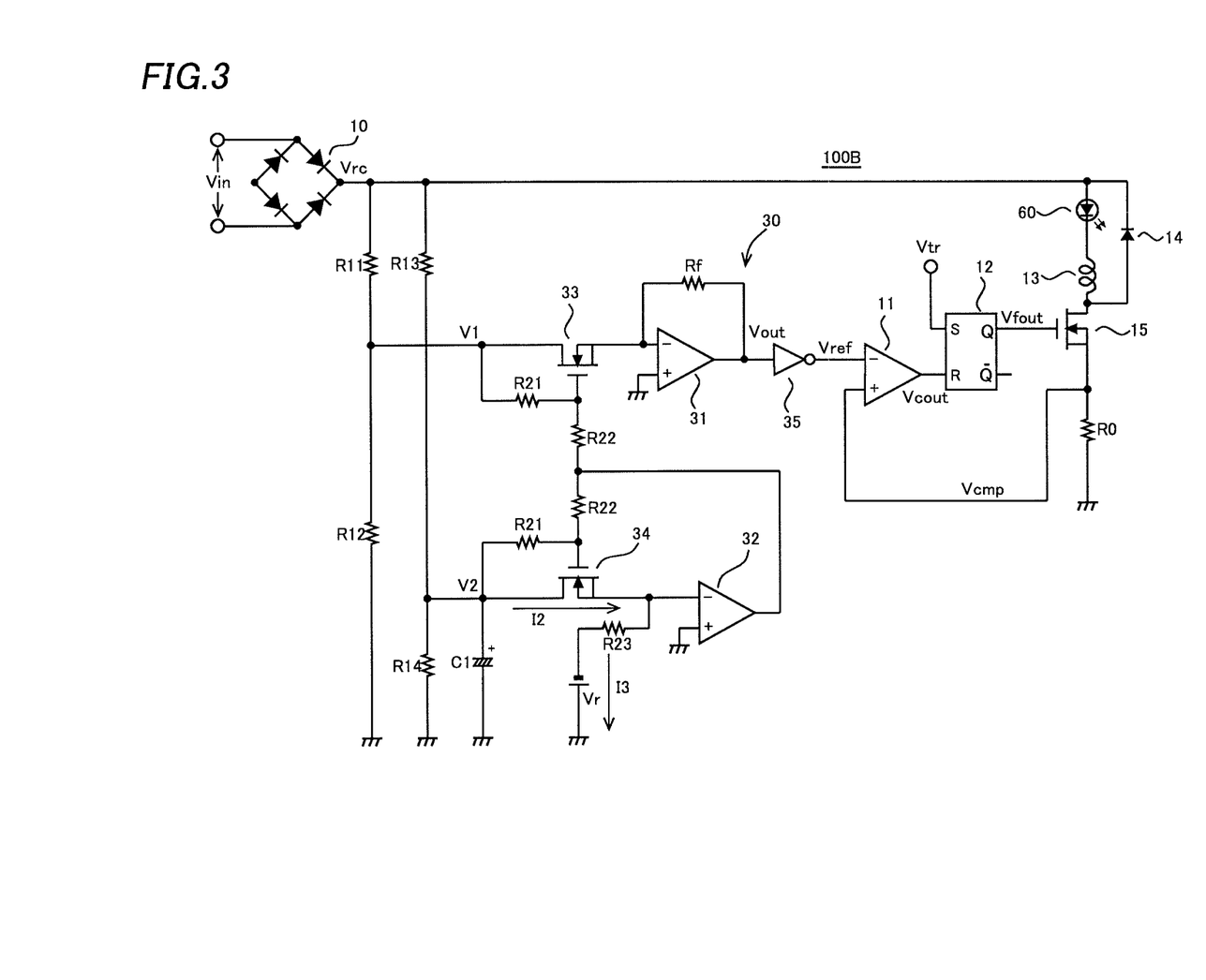
FIG. 3 is a circuit diagram of a light-emitting device control circuit according to a second embodiment of this invention.

FIG. 3 is a circuit diagram of a control circuit 100B for a light-emitting device according to a second embodiment of this invention. The control circuit 100B includes a rectification circuit 10, a reference voltage generation circuit 30, a comparator 11, an RS flip-flop 12, a choke coil 13, a regeneration diode 14, a switching device 15 and a resistor R0 for current detection.

When an alternating current (AC) input voltage Vin is applied to input terminals of the rectification circuit 10, the input voltage Vin is full-wave rectified by the rectification circuit 10. A full-wave rectified voltage Vrc is supplied to an anode of an LED 60 as a drive voltage. A cathode of the LED 60 is connected to the ground through the choke coil 13, the switching device 15 and the resistor R0 that are connected in series. A terminal voltage of the resistor R0 is applied to a non-inverting input terminal (+) of the comparator 11 as a comparison voltage Vcmp.

The control circuit 100B differs from the conventional control circuit 200 shown in FIG. 7 in a structure of the reference voltage generation circuit 30 that generates a reference voltage Vref. The reference voltage generation circuit 30 generates a first voltage V1 by dividing the full-wave rectified voltage Vrc, and also generates a second voltage V2 by dividing the rectified voltage Vrc and smoothing (integrating) the divided voltage.

Then, a voltage division circuit generates the reference voltage Vref that corresponds to V1/V2 that is a ratio of the first voltage V1 to the second voltage V2. As a result, a change in amplitude of the reference voltage Vref can be suppressed when amplitude of the rectified voltage Vrc is varied due to a variation in the AC input voltage Vin supplied from an AC power supply.

The reference voltage generation circuit 30 is composed of a first voltage dividing circuit, a second voltage dividing circuit and the voltage division circuit. Its concrete structure is described below. The first voltage dividing circuit is composed of a first resistor R11 and a second resistor R12 that are connected in series between an output terminal of the rectification circuit 10 to which the rectified voltage Vrc is outputted and the ground. The first voltage V1 is obtained from a connecting node between the first resistor R11 and the second resistor R12. The first voltage V1 is generated by dividing the rectified voltage Vrc, and is represented by Equation 8:

$$V1 = Vm \cdot |\sin \omega t| \cdot \frac{R12}{R11 + R12} \quad \text{[Equation 8]}$$

where each of R11 and R12 denotes a resistance of corresponding each of the first and second resistors R11 and R12. Vm denotes amplitude of the rectified voltage Vrc, ω denotes angular frequency of the AC input voltage Vin, and t denotes time.

The second voltage dividing circuit is composed of a third resistor R13 and a fourth resistor R14, that are connected in series between the output terminal of the rectification circuit 10 to which the rectified voltage Vrc is outputted and the ground, and a smoothing capacitor C1 connected between a connecting node between the third resistor R13 and the fourth resistor R14 and the ground. The second voltage V2 is obtained from the connecting node between the third resistor R13 and the fourth resistor R14. The third resistor R13 and the smoothing capacitor C1 make an integrator.

The second voltage V2 is represented by Equation 9:

$$V2 = \frac{2Vm}{\pi} \cdot \frac{R14}{R13 + R14} \quad \text{[Equation 9]}$$

where each of R13 and R14 denotes a resistance of corresponding each of the third and fourth resistors R13 and R14. $2Vm/\pi$ represents an average DC value of the rectified voltage Vrc.

The voltage division circuit generates the reference voltage Vref that corresponds to V1/V2 that is the ratio of the first voltage V1 to the second voltage V2, and can be formed as described below.

The first voltage V1 is inputted to an inverting input terminal (−) of a first operational amplifier 31 through a first MOS transistor 33 of N-channel type. A non-inverting input terminal (+) of the first operational amplifier 31 is grounded. A resistor Rf is connected between an output terminal of the first operational amplifier 31 and the inverting input terminal (−) as a negative feedback resistor.

A resistor 21 is connected between the connecting node between the first resistor R11 and the second resistor R12 and a gate of the first MOS transistor 33. That is, the first operational amplifier 31 makes an inverting amplifier circuit that inverts and amplifies the first voltage V1. Polarity of an output voltage Vout from the first operational amplifier 31 is inverted by an inverter 35 to generate the reference voltage Vref.

On the other hand, the second voltage V2 is inputted to an inverting input terminal (−) of a second operational amplifier 32 through a second MOS transistor 34 of N-channel type. A non-inverting input terminal (+) of the second operational amplifier 32 is grounded. A resistor 21 is connected between the connecting node between the third resistor R13 and the fourth resistor R14 and a gate of the second MOS transistor 34.

An output terminal of the second operational amplifier 32 is connected to the gate of the first MOS transistor 33 through a resistor R22, and also connected to the gate of the second MOS transistor 34 through another resistor R22. A resistor R23 and a constant voltage source generating a constant voltage Vr that is negative to the ground voltage are connected in series between the inverting input terminal (−) of the second operational amplifier 32 and the ground.

A current I3 flowing through the resistor R23 is represented by Equation 10:

$$I3 = \frac{Vr}{R23} \quad \text{[Equation 10]}$$

where R23 denotes a resistance of the resistor R23.

A resistance between a source and a drain of the second MOS transistor 34 is denoted as rds2, and a current flowing between the source and drain is denoted as 12. The resistance rds2 is represented by Equation 11:

$$rds2 = \frac{V2}{I2} \quad \text{[Equation 11]}$$

Above equations hold because an electric potential at the inverting input terminal (−) of the second operational amplifier 32 becomes an electric potential at the ground (0V) by imaginary short-circuiting.

Since I2=I3, the resistance rds2 is represented by Equation 12:

$$rds2 = \frac{V2}{I2} = \frac{V2}{Vr} \cdot R23 \quad \text{[Equation 12]}$$

When structures of the first MOS transistor 33 and the second MOS transistor 34 are identical, and the drain current is assumed to be independent of the voltage between the drain and the source in a saturation region of the MOS transistors, the following equation holds:

rds1=rds2 where rds1 denotes a resistance between the source and the drain of the first MOS transistor 33.

The output voltage Vout from the first operational amplifier 31 that makes the inverting amplifier circuit is represented by Equation 13:

$$Vout = -V1 \cdot \frac{Rf}{rds2} = -\frac{V1 \cdot Vr}{V2} \cdot \frac{Rf}{R23} \quad \text{[Equation 13]}$$

The reference voltage Vref is equal to Vout with opposite polarity, as represented by Equation 14:

Vref=−Vout    [Equation 14]

Equation 15 is obtained by substituting V1 represented by Equation 8 and V2 represented by Equation 9 into equation 13:

$$Vref = \frac{Vm \cdot |\sin \omega t| \cdot \frac{R12}{R11+R12} \cdot Vr}{\frac{2Vm}{\pi} \cdot \frac{R14}{R13+R14}} \cdot \frac{Rf}{R23} \quad \text{[Equation 15]}$$

Equation 16 is obtained by putting Equation 15 in order:

$$Vref = \frac{\pi \cdot R12 \cdot (R13+R14) \cdot Vr}{2R14 \cdot (R11+R12)} \cdot \frac{Rf}{R23} \cdot |\sin \omega t| \quad \text{[Equation 16]}$$

As understood from Equation 16, the dependence of Vref on the amplitude of the rectified voltage Vrc is removed by the voltage division circuit, so that Vref does not depend on the amplitude Vm of the rectified voltage Vrc and stays unchanged even when the amplitude Vm is varied.

Other structures are the same as those in the conventional control circuit 200. The comparator 11 compares the comparison voltage Vcmp that is the terminal voltage of the resistor R0 with the reference voltage Vref generated by the reference voltage generation circuit 30. A comparison output voltage Vcout from the comparator 11 is at the H level when the comparison voltage Vcmp is larger than the reference voltage Vref, and at the L level when the comparison voltage Vcmp is smaller than the reference voltage Vref. The comparison output voltage Vcout from the comparator 11 is applied to a reset terminal R of the RS flip-flop 12.

A trigger pulse Vtr is periodically inputted to a set terminal S of the RS flip-flop 12. When a frequency of the AC input voltage Vin is between 100 Hz and 120 Hz, it is appropriate that a frequency of the trigger pulse Vtr is between 50 KHz and 100 KHz, which is sufficiently higher than the frequency of Vin.

The RS flip-flop 12 outputs a flip-flop output voltage Vfout from its output terminal Q. The flip-flop output voltage Vfout is applied to a gate of an N-channel type MOS transistor that makes the switching device 15.

The RS flip-flop 12 is set in response to the trigger pulse Vtr, and is reset in response to the comparison output voltage Vcout from the comparator 11, as shown in FIG. 9. When the RS flip-flop 12 is set in response to the trigger pulse Vtr, the flip-flop output voltage Vfout is turned to the H level and the switching device 15 is turned on. Then, the LED 60 is provided with a current that flows through the choke coil 13, the switching device 15 and the resistor R0, and the LED 60 is turned on. Since the current flows through the resistor R0, the comparison voltage Vcmp that is the terminal voltage of the resistor R0 rises at that time. When the comparison voltage Vcmp becomes larger than the reference voltage Vref, the comparison output voltage Vcout is turned to the H level to reset the RS flip-flop 12.

When the RS flip-flop 12 is reset, the flip-flop output voltage Vfout is turned to the L level and the switching device 15 is turned off. As a result, the current provided to the LED 60 through the switching device 15 is cutoff. The control circuit 100B can control average intensity of light emission of the LED 60 by controlling the current flowing through the LED 60, as described above.

With the control circuit 100B, the change in the period of time after the switching device 15 is turned on and before the comparison voltage Vcmp becomes larger than the reference voltage Vref is reduced since the change in the amplitude of the reference voltage Vref is suppressed when the amplitude Vm of the rectified voltage Vrc is varied due to the variation in the AC input voltage Vin supplied from the AC power supply. As a result, the change in the intensity of the light emission of the LED 60 is reduced by reducing an amount of the change in the current flowing through the LED 60 due to the change in the amplitude of the rectified voltage Vrc, while the power factor is improved.

Figure 4:
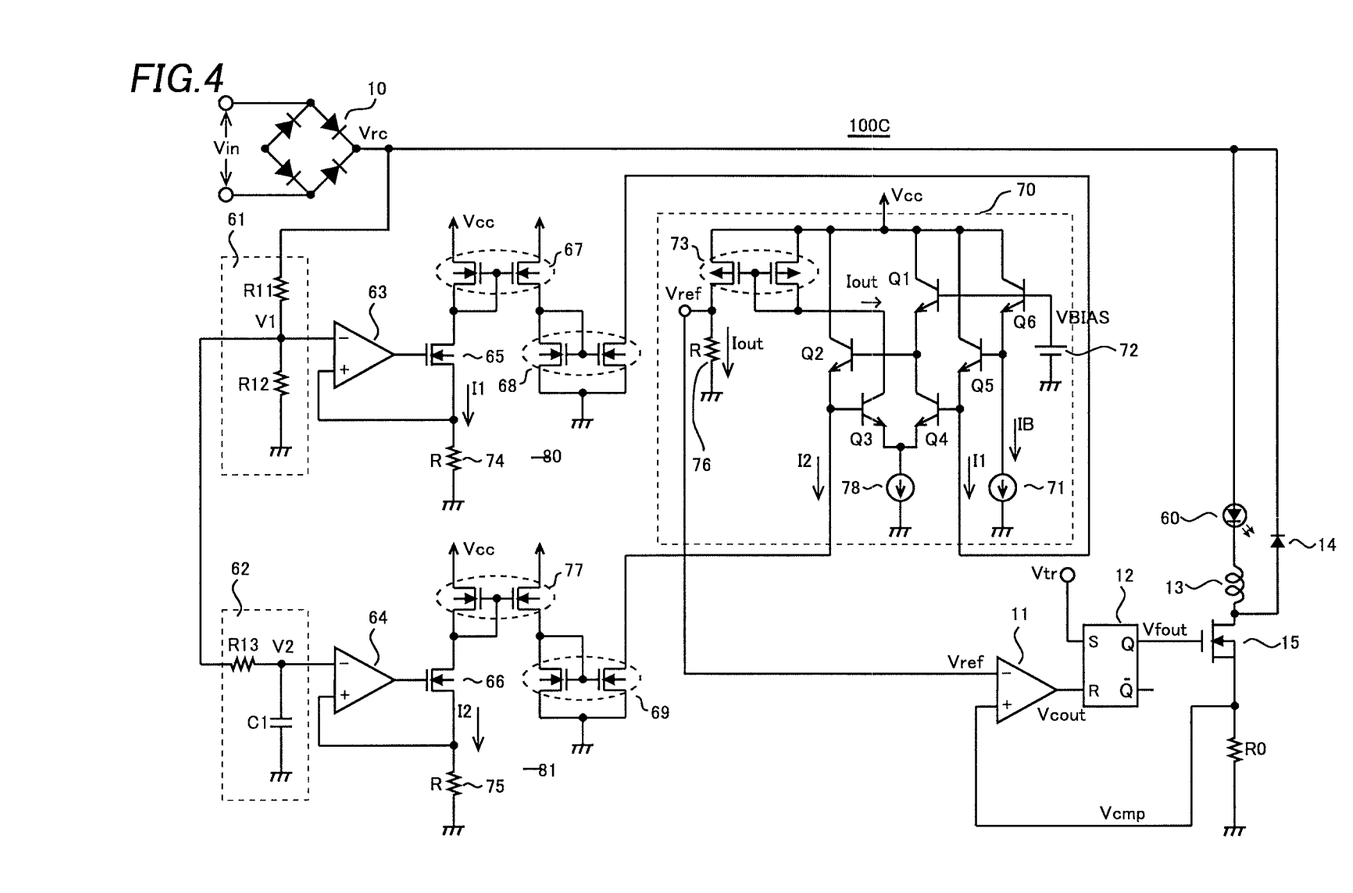
FIG. 4 is a circuit diagram of a light-emitting device control circuit according to a third embodiment of this invention.

FIG. 4 is a circuit diagram of a control circuit 100C for a light-emitting device according to a third embodiment of this invention. The control circuit 100C includes a rectification circuit 10, a voltage dividing circuit 61, a smoothing circuit 62 (integrator), a first voltage/current conversion circuit 80, a second voltage/current conversion circuit 81, a current division circuit 70, a comparator 11, an RS flip-flop 12, a choke coil 13, a regeneration diode 14, a switching device 15 and a resistor R0 for current detection.

When an alternating current (AC) input voltage Vin is applied to input terminals of the rectification circuit 10, the input voltage Vin is full-wave rectified by the rectification circuit 10. A full-wave rectified voltage Vrc is supplied to an anode of an LED 60 as a drive voltage. A cathode of the LED 60 is connected to the ground through the choke coil 13, the switching device 15 and the resistor R0 that are connected in series. A terminal voltage of the resistor R0 is applied to a non-inverting input terminal (+) of the comparator 11 as a comparison voltage Vcmp.

While the control circuit 100B according to the second embodiment requires the constant voltage source that generates the negative constant voltage Vr, the control circuit 100C according to the third embodiment does not need the negative voltage source.

A reference voltage generation circuit in the control circuit 100C according to the third embodiment includes the voltage dividing circuit 61, the smoothing circuit 62 (integrator), the first voltage/current conversion circuit 80, the second voltage/current conversion circuit 81, the current division circuit 70 and a resistor 76 (resistance R).

The voltage dividing circuit 61 is composed of a first resistor R11 and a second resistor R12 that are connected in series between an output terminal of the rectification circuit 10 to which the rectified voltage Vrc is outputted and the ground. A first voltage V1 is obtained from a connecting node between the first resistor R11 and the second resistor R12. The first voltage V1 is generated by dividing the rectified voltage Vrc, and is represented by Equation 17.

$$V1 = Vm \cdot |\sin \omega t| \cdot \frac{R12}{R11+R12} \quad \text{[Equation 17]}$$

where each of R11 and R12 denotes a resistance of corresponding each of the first and second resistors R11 and R12. Vm denotes amplitude of the rectified voltage Vrc, w denotes angular frequency of the AC input voltage Vin, and t denotes time.

The smoothing circuit 62 is composed of a resistor R13 and a smoothing capacitor C1. The smoothing circuit 62 is equivalent to an integrator. A first terminal of the resistor R13 is connected to a connecting node between the first resistor R11 and the second resistor R12. The smoothing capacitor C1 is connected between a second terminal of the resistor R13 and the ground.

The smoothing circuit 62 smoothes (integrates) the first voltage V1 and generates a second voltage V2. The second voltage V2 is represented by Equation 18:

$$V2 = \frac{2Vm}{\pi} \cdot \frac{R12}{R11+R12} \quad \text{[Equation 18]}$$

where $2Vm/\pi$ represents an average DC value of the rectified voltage Vrc. The second voltage dividing circuit in the control circuit 100B according to the second embodiment, which is composed of the resistors R13 and R14 and the smoothing capacitor C1, may be used instead of the smoothing circuit 62.

The first voltage/current conversion circuit 80 converts the first voltage V1 into a first current I1 that is proportional to the first voltage V1. The first voltage/current conversion circuit 80 includes a first operational amplifier 63, an N-channel type control transistor 65 and a resistor 74 (resistance R). The first voltage V1 is applied to an inverting input terminal (−) of the first operational amplifier 63, while a terminal voltage of the resistor 74 is applied to its non-inverting input terminal (+). An output from the first operational amplifier 63 is applied to a gate of the control transistor 65.

Then, the first current I1 flows through the control transistor 65 so that the terminal voltage of the resistor 74 becomes equal to the first voltage V1. Since the first current I1 flows through the resistor 74, the first current I1 is represented by Equation 19:

$$I1 = \frac{V1}{R} \quad \text{[Equation 19]}$$

The second voltage/current conversion circuit 81 converts the second voltage V2 into a second current I2 that is proportional to the second voltage V2. The second voltage/current conversion circuit 81 includes a second operational amplifier 64, an N-channel type control transistor 66 and a resistor 75 (resistance R). The second voltage V2 is applied to an inverting input terminal (−) of the second operational amplifier 64, while a terminal voltage of the resistor 75 is applied to its non-inverting input terminal (+). An output from the second operational amplifier 64 is applied to a gate of the control transistor 66.

Then, the second current I2 flows through the control transistor 66 so that the terminal voltage of the resistor 75 becomes equal to the second voltage V2. Since the second current I2 flows through the resistor 75, the second current I2 is represented by Equation 20:

$$I2 = \frac{V2}{R} \quad \text{[Equation 20]}$$

The current division circuit 70 generates an output current Iout that corresponds to a ratio of the first current I1 to the second current I2. The first current I1 is supplied to the current division circuit 70 through two current mirror circuits 67 and 68. The second current I2 is supplied to the current division circuit 70 through two current mirror circuits 77 and 69.

The current division circuit 70 includes NPN type bipolar transistors Q1, Q2, Q3, Q4, Q5 and Q6, constant current sources 71 and 78, a bias voltage source 72 that generates a bias voltage VBIAS and a current mirror circuit 73. It is configured so that the first current I1 flows through an emitter of the transistor Q5 and the second current I2 flows through the transistor Q2.

Since a sum of base-emitter voltages VBE of the NPN type bipolar transistors Q1, Q2 and Q3 is equal to a sum of base-emitter voltages VBE of the NPN type bipolar transistors Q4, Q5 and Q6 in the current division circuit 70, the following equation regarding a collector current Ic of each of the transistors holds.

$$Ic(Q1) \cdot Ic(Q2) \cdot Ic(Q3) = Ic(Q4) \cdot Ic(Q5) \cdot Ic(Q6)$$

The following equations hold when a base current of each of the transistors is neglected:

$$Ic(Q1) = Ic(Q4)$$

$$Ic(Q2) = I2$$

$$Ic(Q3) = Iout$$

$$Ic(Q5) = I1$$

$$Ic(Q6) = IB$$

where IB denotes a current supplied from the constant current source 71.

Then, the following equations are derived from the equations above:

$$Ic(Q3) = Ic(Q5) \cdot Ic(Q6)/Ic(Q2)$$

$$Iout = I1 \cdot IB/I2$$

Equation 21 is obtained by substituting Equations 17-20 into the above equation representing Iout.

$$Iout = (\pi/2 \cdot IB) \cdot |\sin \omega t| \quad \text{[Equation 21]}$$

The output current Iout is provided to the output resistor 76 through the current mirror circuit 73. As a result, the reference voltage Vref represented by Equation 22 is obtained as a terminal voltage of the output resistor 76:

$$Vref = (\pi/2 \cdot IB \cdot R) \cdot |\sin \omega t| \quad \text{[Equation 22]}$$

As understood from Equation 22, the dependence of Vref on the amplitude Vm of the rectified voltage Vrc is removed by the current division circuit 70 so that Vref does not depend on the amplitude Vm of the rectified voltage Vrc and stays unchanged even when the amplitude Vm is varied. As a result, a change in amplitude of the reference voltage Vref can be suppressed when the amplitude Vm of the rectified voltage Vrc is varied due to a variation in the AC input voltage Vin supplied from an AC power supply. Other structures are the same as those in the control circuit 100B according to the second embodiment.

Figure 5:
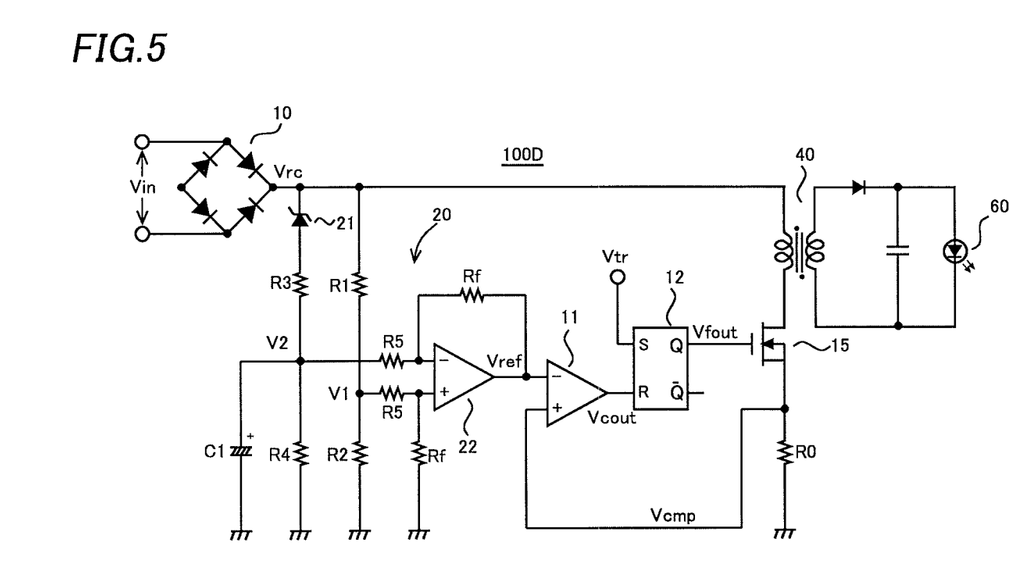
FIG. 5 is a circuit diagram of a light-emitting device control circuit according to a fourth embodiment of this invention.

FIG. 5 is a circuit diagram of a control circuit 100D for a light-emitting device according to a fourth embodiment of this invention. Since the control circuit 100A (refer to FIG. 1.) for the light-emitting device according to the first embodiment is a non-insulated type in which the LED 60 is directly connected to the rectification circuit 10, there is a risk of electric shock when one tries to replace the LED 60.

Thus, to prevent the electric shock at the replacement of the LED 60, the control circuit 100D for the light-emitting device according to the fourth embodiment provides an LED 60 with a current through an insulation transformer 40. That is, a primary coil of the insulation transformer 40 is connected to a rectification circuit 10, while its secondary coil is connected to the LED 60.

Since a resistor R0 is provided with a current flowing through the primary coil of the insulation transformer 40 and the LED 60 is provided with a current corresponding to the current flowing through the primary coil, the same control can be performed by the control circuit 100D as performed by the control circuit 100A according to the first embodiment.

Figure 6:
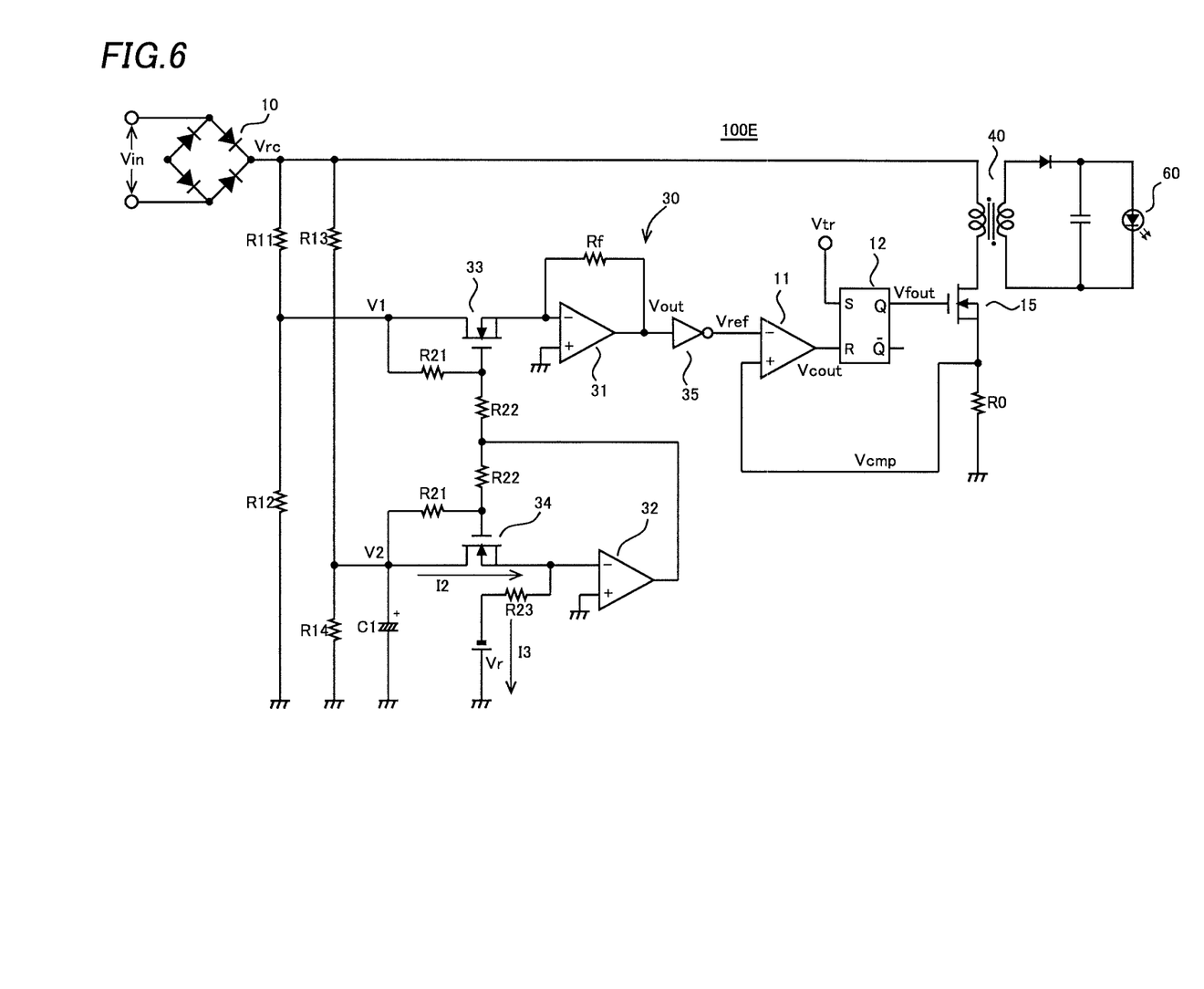
FIG. 6 is a circuit diagram of a light-emitting device control circuit according to a fifth embodiment of this invention.

FIG. 6 is a circuit diagram of a control circuit 100E for a light-emitting device according to a fifth embodiment of this invention. Since the control circuit 100B (refer to FIG. 3.) for the light-emitting device according to the second embodiment is a non-insulated type in which the LED 60 is directly connected to the rectification circuit 10, there is a risk of electric shock when one tries to replace the LED 60.

Thus, to prevent the electric shock at the replacement of the LED 60, the control circuit 100E for the light-emitting device according to the fifth embodiment provides an LED 60 with a current through an insulation transformer 40. That is, a primary coil of the insulation transformer 40 is connected to a rectification circuit 10, while its secondary coil is connected to the LED 60.

Since a resistor R0 is provided with a current flowing through the primary coil of the insulation transformer 40 and the LED 60 is provided with a current corresponding to the current flowing through the primary coil, the same control can be performed by the control circuit 100E as performed by the control circuit 100B according to the second embodiment.

It is noted that the insulated type structure can be also adopted in place of the control circuit 100C according to the third embodiment.

A control circuit according to a sixth embodiment is to improve the light-emitting device control circuits 100B, 100C and 100C according to the second, third and fifth embodiments.

A light-emitting device control circuit generally performs dimming by controlling the current flowing through the LED 60 by controlling a conduction angle of the AC input voltage Vin with a dimmer such as a triac. In that case, the rectification circuit 10 rectifies the AC input voltage Vin, the conduction angle of which is controlled by the dimmer.

A duty ratio of the dimmer (triac), which corresponds to the conduction angle of the rectified voltage Vrc, is defined. When off-time of the triac during a half period T/2 of the AC voltage is denoted as t1, on-time is represented as T/2−t1. Therefore, the duty ratio is defined by Equation 23:

$$\text{Duty Ratio} = \frac{\frac{T}{2} - t1}{\frac{T}{2}} \quad \text{[Equation 23]}$$

It is preferable that the dimming control using the dimmer satisfies following features (1) and (2).
(1) A constant current is provided to the LED 60 by suppressing a change in amplitude of a reference voltage Vref even when the AC input voltage Vin supplied from an AC power supply is varied.
(2) The current flowing through the LED 60 linearly increases as the duty ratio of the dimmer (triac) increases, and the current flowing through the LED reaches its maximum when the duty ratio is 100%.

Although the light-emitting device control circuits 100B, 100C and 100E according to the second, third and fifth embodiments satisfy the feature (1) because they perform the arithmetic operation (V1/V2) with the division circuit, they do not satisfy the feature (2).

Figure 11:
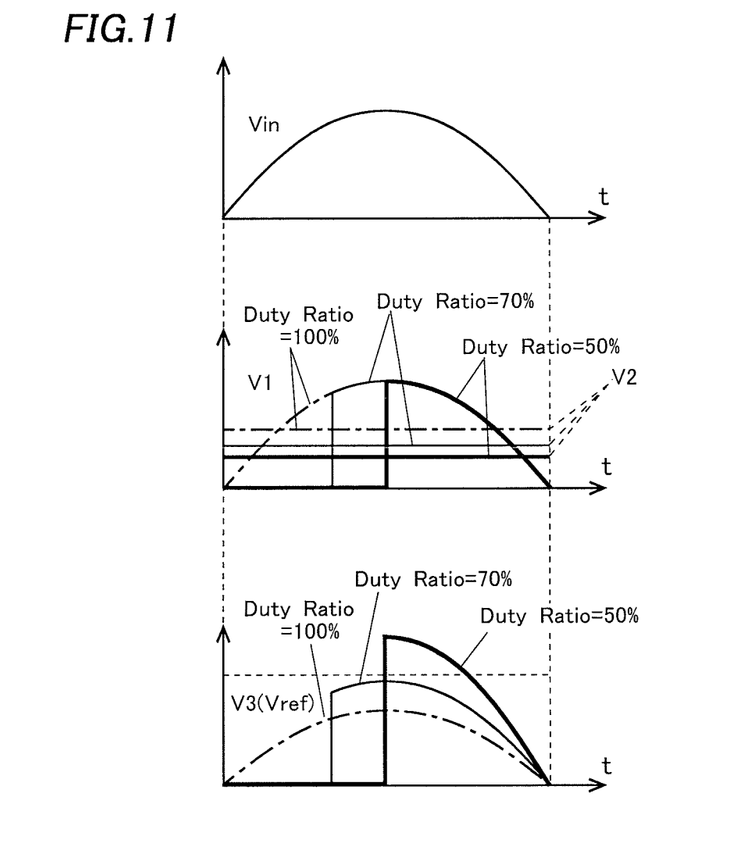
FIG. 11 shows correlation between each of first through third voltages V1-V3 and a duty ratio of a dimmer (triac).

The reason why they do not satisfy the feature (2) is explained referring to FIG. 11. FIG. 11 shows changes in the first voltage V1, the second voltage V2 and the third voltage V3 over time during the half period T/2 of the AC voltage for each of the duty ratios 50%, 70% and 100% of the dimmer (triac).

The first voltage V1 is generated by dividing the rectified voltage Vrc, and the second voltage V2 is generated by dividing and integrating the rectified voltage Vrc. The third voltage V3 corresponds to V1/V2, and is used as the reference voltage Vref. The second voltage V2 decreases as the duty ratio decreases. As a result, the third voltage V3 (=reference voltage Vref) is increased. Since the third voltage V3 varies as described above, the current does not linearly increase with respect to the duty ratio.

A circuit structure in which the third voltage V3 is clamped to a certain value when the duty ratio decreases a certain degree is conceivable. In that case, however, the current flowing through the LED 60 decreases when the duty ratio increases to a certain degree and there remains a problem that the current flowing through the LED 60 does not reach the maximum when the duty ratio is 100%.

Figure 12:
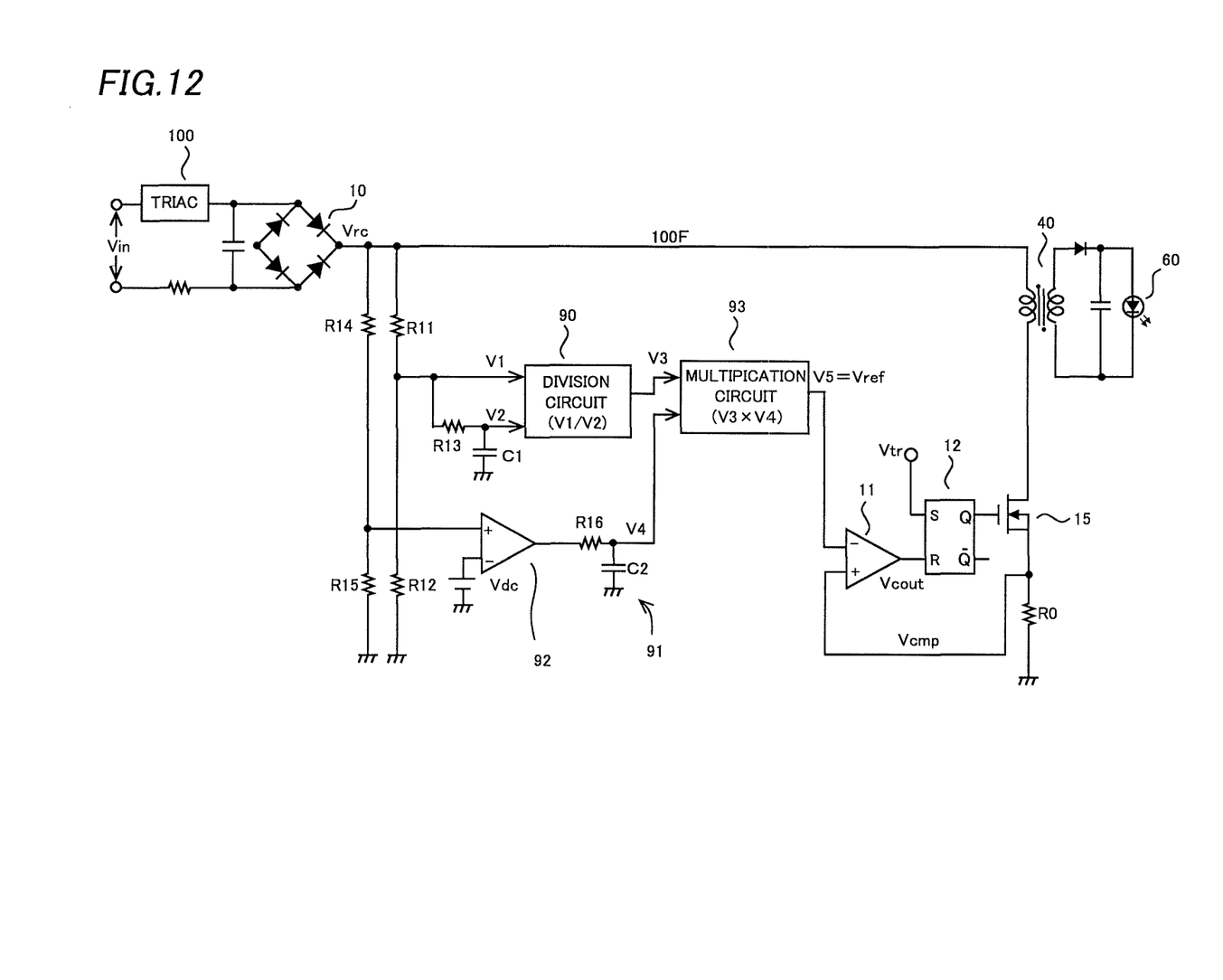
FIG. 12 is a circuit diagram of a light-emitting device control circuit according to a sixth embodiment of this invention.

In the control circuit according to the sixth embodiment, a voltage corresponding to a product of a third voltage V3 and a voltage corresponding to a duty ratio of a triac 100 is made to be the reference voltage Vref so that a change in the reference voltage Vref due to the duty ratio is cancelled out to satisfy the above-mentioned features (1) and (2).

Figure 13:
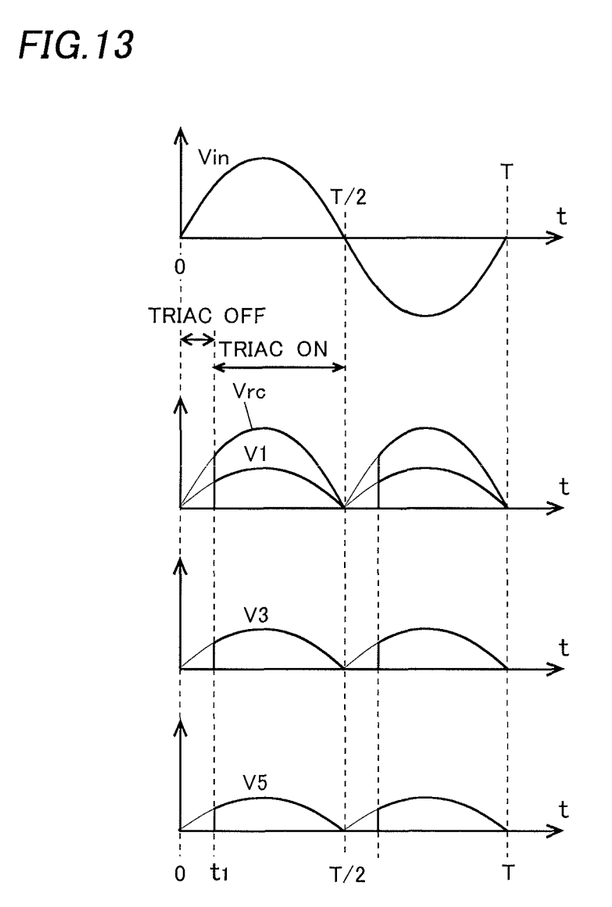
FIG. 13 is an operational waveform diagram of the light-emitting device control circuit according to the sixth embodiment of this invention.

FIG. 12 is a circuit diagram of the control circuit 100F for a light-emitting device according to the sixth embodiment. FIG. 13 is a waveform diagram of the rectified voltage Vrc, the first voltage V1, the third voltage V3 and a fifth voltage V5 in the control circuit 100F.

In the control circuit 100F, the rectification circuit 10 generates the rectified voltage Vrc by full-wave rectifying the AC input voltage Vin, the conduction angle of which is controlled through the triac 100.

As described above, the first voltage V1 is generated by dividing the rectified voltage Vrc, and the second voltage V2 is generated by dividing and integrating the rectified voltage Vrc. The third voltage V3 corresponds to V1/V2 as a result of arithmetic operation performed by a division circuit 90. The division circuit 90 is practically the same as the division circuit in the control circuit according to each of the second, third and fifth embodiments.

In addition to the division circuit 90, the control circuit 100F is provided with a duty ratio detection circuit 91 detecting a fourth voltage V4 corresponding to the duty ratio of the triac 100 and a multiplication circuit 93 generating the fifth voltage V5 (=reference voltage Vref) by multiplying the third voltage V3 outputted from the division circuit 90 and the fourth voltage V4.

The duty ratio detection circuit 91 is provided with a comparator 92 and an integrator composed of a resistor R16 and a capacitor C2. The comparator 92 compares a voltage corresponding to the rectified voltage Vrc outputted from a connecting node between a resistor R14 and a resistor R15 that are connected in series between an output terminal to which the rectified voltage Vrc is outputted and the ground with a predetermined voltage Vdc. The predetermined voltage Vdc is sufficiently smaller than amplitude Vm of the rectified voltage Vrc so that the duty ratio of the triac 100 is appropriately detected. The voltage V4 corresponding to the duty ratio of the triac 100 is outputted from the integrator in the duty ratio detection circuit 91.

It should be noted that the control circuit 100F shown in FIG. 12 in which the LED 60 is provided with the current through an insulation transformer 40 is only an example and that similar characteristics can be obtained with a non-insulated type control circuit that does not use the insulation transformer 40.

With each of the light-emitting device control circuits according to the embodiments of this invention, it is made possible that the change in the amount of the current flowing through the light-emitting device is reduced while the power factor is improved, since the change in the amplitude of the reference voltage is suppressed when the amplitude of the AC input voltage is varied.

What is claimed is:

1. A control circuit for a light-emitting device, comprising:
   a rectification circuit rectifying an AC voltage to generate a rectified voltage;
   a switching device configured to turn on and off the light emitting device;
   a reference voltage generation circuit generating a reference voltage;
   a first comparator comparing a comparison voltage with the reference voltage, the comparison voltage corresponding to a current flowing through the light-emitting device in response to the rectified voltage; and
   a flip-flop configured to be set in response to a trigger pulse and reset in response to a result of comparison by the first comparator, the flip-flop outputting an output voltage and controlling the switching device in accordance with the output voltage, wherein the reference voltage generation circuit is configured so that a change in amplitude of the reference voltage is suppressed when amplitude of the AC voltage varies.

2. The control circuit of claim 1, wherein the reference voltage generation circuit comprises a first detection circuit detecting the rectified voltage, a second detection circuit converting the rectified voltage into a DC voltage and detecting the DC voltage, and a subtraction circuit generating a value corresponding to a difference between a value detected by the first detection circuit and a value detected by the second detection circuit, and the reference voltage is obtained based on the value corresponding the difference.

3. The control circuit of claim 2, wherein the first detection circuit comprises a first resistor and a second resistor connected in series between an output terminal of the rectification circuit and a ground and outputs a first voltage from a connecting node between the first and second resistors, the second detection circuit comprises a zener diode, a third resistor, a fourth resistor and a smoothing capacitor and outputs a second voltage, the zener diode, the third resistor and the fourth resistor being connected in series in the order as described above between the output terminal of the rectification circuit and the ground, the smoothing capacitor being connected between a connecting node between the third and fourth resistors and the ground, the second voltage being outputted from a connecting node between the third and fourth resistors, and the subtraction circuit comprises a differential amplifier circuit amplifying a difference between the first voltage and the second voltage.

4. The control circuit of claim 1, wherein the reference voltage generation circuit comprises a first detection circuit detecting the rectified voltage, a second detection circuit converting the rectified voltage into a DC voltage and detecting the DC voltage, and a division circuit dividing a value detected by the first detection circuit by a value detected by the second detection circuit, and the reference voltage is obtained from the division circuit.

5. The control circuit of claim 4, wherein the first detection circuit comprises a first resistor and a second resistor and outputs a first voltage, the first and second resistors being connected in series between an output terminal of the rectification circuit and a ground, the first voltage being outputted from a connecting node between the first and second resistors, the second detection circuit comprises a third resistor, a fourth resistor and a smoothing capacitor and outputs a second voltage, the third resistor and the fourth resistor being connected in series in the order as described above between the output terminal of the rectification circuit and the ground, the smoothing capacitor being connected to a connecting node between the third and fourth resistors, the second voltage being outputted from a connecting node between the third and fourth resistors, and the division circuit comprises a first operational amplifier, a second operational amplifier, a resistor and a constant voltage source, a non-inverting input terminal of the first operational amplifier being grounded, the first voltage being inputted to an inverting input terminal of the first operational amplifier through a first MOS transistor, a feedback resistor being connected between an output terminal and the inverting input terminal of the first operational amplifier, a non-inverting input terminal of the second operational amplifier being grounded, the second voltage being inputted to an inverting input terminal of the second operational amplifier through a second MOS transistor, an output terminal of the second operational amplifier being connected to a gate of each of the first and second MOS transistors, the resistor and the constant voltage source being connected in series between the inverting input terminal of the second operational amplifier and the ground.

6. The control circuit of claim 1, wherein the reference voltage generation circuit comprises a first detection circuit detecting the rectified voltage, a second detection circuit converting the rectified voltage into a DC voltage and detecting the DC voltage, a first conversion circuit converting a value detected by the first detection circuit into a first current proportional to the value detected by the first detection circuit, a second conversion circuit converting a value detected by the second detecting circuit into a second current proportional to the value detected by the second detection circuit, a division circuit generating an output current corresponding to a ratio of the first current to the second current, and a current/voltage conversion circuit converting the output current into the reference voltage.

7. The control circuit of claim 1, wherein a conduction angle of the AC voltage is controlled through a dimmer, and the reference voltage generation circuit comprises a first detection circuit detecting the rectified voltage, a second detection circuit converting the rectified voltage into a DC voltage and detecting the DC voltage, a division circuit outputting a voltage corresponding to a ratio of a value detected by the first detection circuit to a value detected by the second detection circuit, a duty ratio detection circuit detecting a voltage corresponding to a duty ratio of the dimmer, and a multiplication circuit generating the reference voltage by multiplying the voltage outputted from the division circuit and the voltage corresponding to the duty ratio.

8. The control circuit of claim 7, wherein the duty ratio detection circuit comprises a second comparator comparing the rectified voltage with a predetermined voltage and an integrator converting an output voltage from the second comparator into a DC voltage.

9. A method for controlling a light-emitting device, comprising:
- generating rectified voltage at a first node;
- generating a first voltage at a second node from the rectified voltage at the first node;
- generating a second voltage at a third node from the rectified voltage at the first node;
- generating a reference voltage in response to the first voltage at the second node and the second voltage at the third node;
- generating a control voltage in response to the reference voltage; and
- using the rectified voltage at the first node and the control voltage to control the light-emitting device.

10. The method of claim 9, further including smoothing the second voltage at the third node.

11. The method of claim 9, wherein generating the first voltage at the second node includes voltage dividing the rectified voltage at the first node and generating the second voltage at the third node includes voltage dividing the rectified voltage at the first node.

12. The method of claim 9, wherein generating the reference voltage in response to the first voltage at the second node and the second voltage at the third node includes taking a difference between the first voltage at the second node and the second voltage at the third node.

13. The method of claim 9, wherein generating the reference voltage includes generating the reference voltage to be independent of an amplitude of an AC input voltage.

14. The method of 9, further including using the control voltage to open or close a switch.

15. The method of claim 14, wherein using the control voltage to open or close the switch includes using the control voltage to close the switch wherein a current flows in response to the switch being closed.

16. The method of claim 9, wherein generating the reference voltage in response to the first voltage at the second node and the second voltage at the third node includes dividing the first voltage by the second voltage.

17. The method of claim 9, wherein generating the reference voltage in response to the first voltage at the second node and the second voltage at the third node includes:
- generating a first current in response to the first voltage;
- generating a second current in response to the second voltage;
- generating a third current in response to the first current and the second current; and
- using the third current to generate the reference voltage.

18. The method of claim 17, wherein generating the first current includes generating the first current to be proportional to the first voltage and generating the second current to be proportional to the second voltage.

19. The method of claim 9, wherein using the rectified voltage at the first node and the control voltage to control the light-emitting device includes coupling the rectified voltage to the light-emitting device through an insulation transformer.

20. The method of claim 9, wherein generating the reference voltage in response to the first voltage at the second node and the second voltage at the third node further includes generating a third voltage in response to a ratio of the first voltage and the second voltage, detecting a fourth voltage in response to a duty ratio of a triac, and generating the reference voltage in response to multiplying the third voltage and the fourth voltage.

\* \* \* \* \*